US012592260B2

(12) United States Patent　　(10) Patent No.:　US 12,592,260 B2
Ou et al.　　　　　　　　　　　　(45) Date of Patent:　　Mar. 31, 2026

(54) VIDEO GENERATION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Tongtong Ou, Beijing (CN); Boheng Qiu, Beijing (CN); Chao He, Beijing (CN); Shinan Li, Beijing (CN); Yuerong Song, Beijing (CN); Zhicheng Wang, Beijing (CN); Shibo Ren, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 18/483,289

(22) Filed: Oct. 9, 2023

(65) Prior Publication Data

US 2024/0038273 A1　　Feb. 1, 2024

Related U.S. Application Data

(63) Continuation-in-part of application No. PCT/CN2022/086090, filed on Apr. 11, 2022.

(30) Foreign Application Priority Data

Apr. 9, 2021　(CN) .......................... 202110384712.8

(51) Int. Cl.
　*G11B 27/031*　　(2006.01)
　*G06V 20/40*　　(2022.01)
　　　　(Continued)

(52) U.S. Cl.
　CPC ............ *G11B 27/031* (2013.01); *G06V 20/41* (2022.01); *G06V 20/46* (2022.01); *H04N 5/2624* (2013.01); *H04N 23/62* (2023.01)

(58) Field of Classification Search
　USPC .......................................... 386/278
　See application file for complete search history.

(56) References Cited

U.S. PATENT DOCUMENTS

2011/0098056 A1*　4/2011　Rhoads .................. G01C 21/36
　　　　　　　　　　　　　　　　　　　345/173
2012/0035934 A1*　2/2012　Cunningham .......... G06F 3/165
　　　　　　　　　　　　　　　　　　　704/260

(Continued)

FOREIGN PATENT DOCUMENTS

CN　　　103915106 A　　7/2014
CN　　　108833934 A　　11/2018

(Continued)

OTHER PUBLICATIONS

Extended European Search Report for European Patent Application No. 22784167.3, mailed Jul. 16, 2024, 5 pages.

(Continued)

*Primary Examiner* — Nigar Chowdhury
(74) *Attorney, Agent, or Firm* — Astute IP Law Group

(57) ABSTRACT

Provided are a video generation method and apparatus, an electronic device and a storage medium. The method includes: receiving a triggering operation acting on a video capturing interface and capturing an original video in response to the triggering operation; determining a video segment of interest in the original video; and performing video synthesis processing based on the video segment of interest and the original video to obtain a target video.

11 Claims, 8 Drawing Sheets

(51) Int. Cl.
  *H04N 5/262* (2006.01)
  *H04N 23/62* (2023.01)

(56) References Cited

U.S. PATENT DOCUMENTS

| | | | |
|---|---|---|---|
| 2012/0052930 A1* | 3/2012 | McGucken | A63F 13/47 463/1 |
| 2012/0054095 A1* | 3/2012 | Lesandro | G06Q 20/12 705/39 |
| 2015/0356093 A1* | 12/2015 | Abbas | G06F 16/9535 707/748 |
| 2016/0259528 A1* | 9/2016 | Foss | G06F 3/0485 |
| 2016/0366330 A1* | 12/2016 | Boliek | G06V 20/41 |
| 2017/0070779 A1* | 3/2017 | Kim | H04N 21/8549 |
| 2018/0122422 A1* | 5/2018 | Allison | H04N 21/42202 |
| 2018/0132006 A1* | 5/2018 | Galant | G11B 27/105 |
| 2018/0132011 A1* | 5/2018 | Shichman | H04N 21/233 |
| 2018/0343294 A1* | 11/2018 | Rands | G06F 16/24575 |
| 2019/0114487 A1 | 4/2019 | Vijayanarasimhan et al. | |
| 2019/0116338 A1* | 4/2019 | Ma | H04N 7/15 |
| 2019/0354763 A1* | 11/2019 | Stojancic | G06V 20/41 |
| 2019/0356837 A1* | 11/2019 | Bakshi | H04N 7/142 |
| 2019/0373322 A1* | 12/2019 | Rojas-Echenique | G06N 3/045 |
| 2019/0392866 A1* | 12/2019 | Yoon | G11B 27/28 |
| 2020/0226386 A1* | 7/2020 | Chuang | G06V 20/46 |
| 2020/0322647 A1* | 10/2020 | Zheng | H04N 21/8549 |
| 2021/0019982 A1* | 1/2021 | Todd | H04N 21/2343 |
| 2021/0105442 A1* | 4/2021 | Shoa Hassani Lashdan | G06N 3/047 |
| 2021/0129017 A1* | 5/2021 | White | A63F 13/44 |
| 2021/0224950 A1* | 7/2021 | Otterness | G06V 20/41 |
| 2021/0264952 A1 | 8/2021 | Zhu et al. | |
| 2022/0108727 A1* | 4/2022 | van Welzen | G11B 27/031 |
| 2022/0121623 A1* | 4/2022 | Lyske | G06F 9/52 |
| 2023/0362481 A1* | 11/2023 | Chen | H04N 23/90 |

FOREIGN PATENT DOCUMENTS

| | | | |
|---|---|---|---|
| CN | 109168015 A | 1/2019 | |
| CN | 109714644 A | 5/2019 | |
| CN | 110191357 A | 8/2019 | |
| CN | 110347872 A | 10/2019 | |
| CN | 111432290 A | 7/2020 | |
| CN | 111556363 A | 8/2020 | |
| CN | 111654619 A | 9/2020 | |
| CN | 111988638 A | 11/2020 | |
| CN | 113099129 A | 7/2021 | |
| KR | 20190106547 A | 9/2019 | |
| WO | 2016/029447 A1 | 3/2016 | |
| WO | 2020/187086 A1 | 9/2020 | |

OTHER PUBLICATIONS

Zeng et al., "Title Generation for User Generated Videos", Conference: European Conference on Computer Vision, LNCS 9906, v2, XP047565743, Sep. 17, 2016, pp. 609-625.

Written Opinion for International Application No. PCT/CN2022/086090, mailed Jun. 2, 2022, 9 Pages.

International Search Report issued in PCT/CN2022/086090, mailed Jun. 2, 2022.

Chinese First Office Action issued in Chinese Application No. 202110384712.8 on May 7, 2022.

Chinese Second Office Action issued in Chinese Application No. 202110384712.8 on Dec. 16, 2022.

Chinese Third Office Action issued in Chinese Application No. 202110384712.8 on Apr. 12, 2023.

Chinese Notice of Rejection issued in Chinese Application No. 202110384712.8 on Jul. 11, 2023.

Office Action received for European Patent Application No. 22784167.3, mailed on Oct. 14, 2025, 10 pages.

Lan et al., "Creating video summarization from emotion perspective", International Conference on Signal Processing (ICSP), ISBN: 978-1-4799-2188-1, Nov. 6, 2016, pp. 1112-1117.

\* cited by examiner

Receive a triggering operation acting on a video capturing interface and capture an original video in response to the triggering operation ~ 110

Determine a video segment of interest in the original video ~ 120

Perform video synthesis processing based on the video segment of interest and the original video to obtain a target video ~ 130

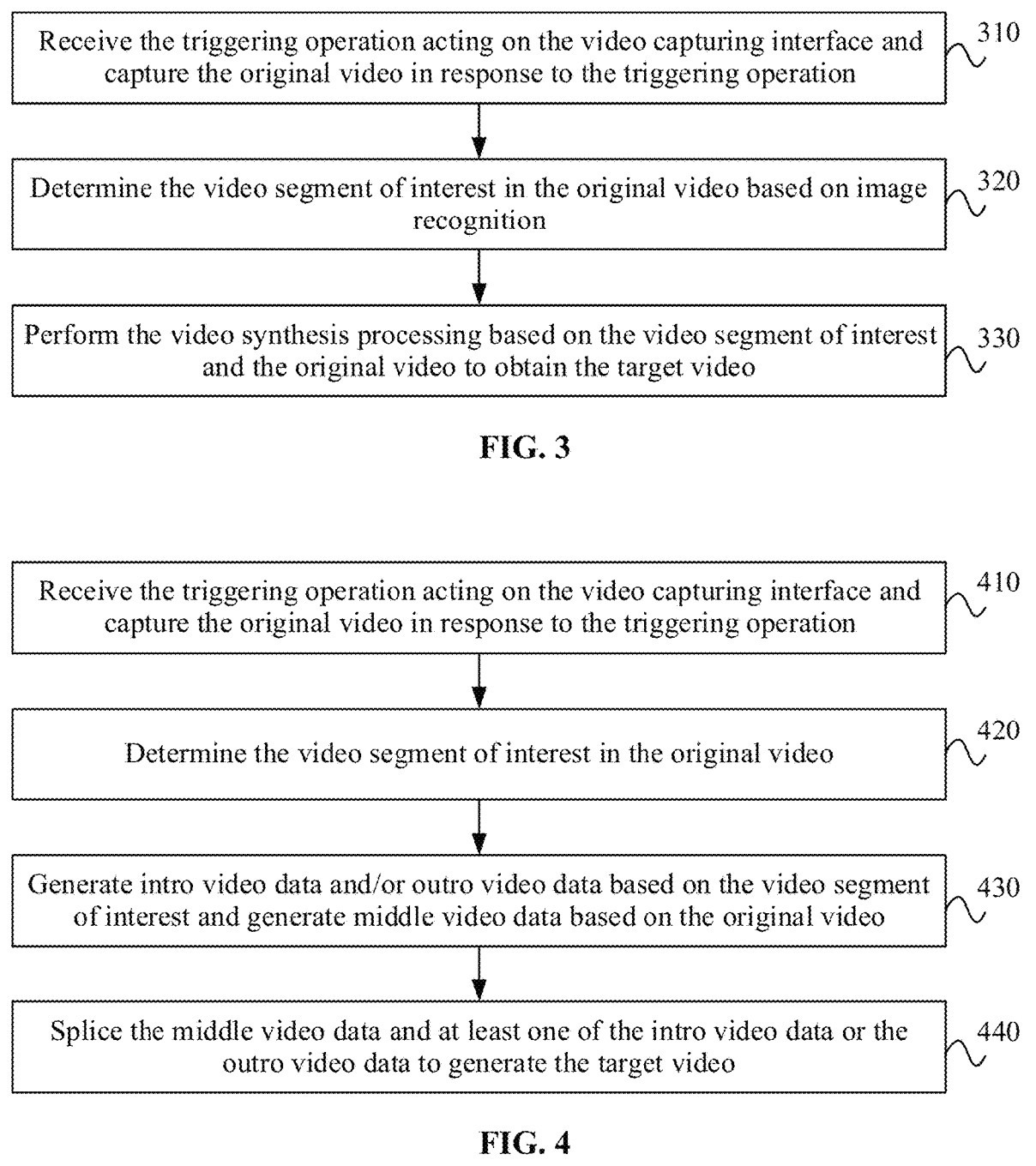

Receive the triggering operation acting on the video capturing interface and capture the original video in response to the triggering operation ⟩310

↓

Determine the video segment of interest in the original video based on image recognition ⟩320

↓

Perform the video synthesis processing based on the video segment of interest and the original video to obtain the target video ⟩330

FIG. 3

Receive the triggering operation acting on the video capturing interface and capture the original video in response to the triggering operation ⟩410

↓

Determine the video segment of interest in the original video ⟩420

↓

Generate intro video data and/or outro video data based on the video segment of interest and generate middle video data based on the original video ⟩430

↓

Splice the middle video data and at least one of the intro video data or the outro video data to generate the target video ⟩440

FIG. 4

VIDEO GENERATION METHOD AND APPARATUS, ELECTRONIC DEVICE, AND STORAGE MEDIUM

CROSS REFERENCE TO RELATED APPLICATIONS

This application is a continuation-in-part of International Patent Application No. PCT/CN2022/086090, filed on Apr. 11, 2022, which is based on and claims priority to Chinese Patent Application No. 202110384712.8 filed with the China National Intellectual Property Administration (CNIPA) on Apr. 9, 2021, disclosures of which are incorporated herein by reference in their entireties.

TECHNICAL FIELD

Embodiments of the present disclosure relate to the field of computer technologies, for example, a video generation method and apparatus, an electronic device and a storage medium.

BACKGROUND

With the popularization of intelligent terminals, various types of applications installed in the intelligent terminals are emerging endlessly, for example, video applications in various forms. The current user may watch videos shared by other users to a platform and may also record his videos and then share them with other users of the platform.

At present, when performing video capturing based on various small video applications, the user may use some capturing props or special effects provided by the applications to obtain a video with a better effect. However, as users' requirements become higher and higher, videos generated by a video application in the related art have a relatively single effect and cannot satisfy the users' requirements. In addition, the video application in the related art has a poor processing effect for video capturing or has a complex processing manner which requires more manual operations of the users, affecting the user experience.

SUMMARY

Embodiments of the present disclosure provide a video generation method and apparatus, an electronic device and a storage medium so that automatic video editing and synthesis can be achieved, and the video processing effect can be improved.

In a first aspect, an embodiment of the present disclosure provides a video generation method. The method includes the steps below.

A triggering operation acting on a video capturing interface is received, and an original video is captured in response to the triggering operation.

A video segment of interest in the original video is determined.

Video synthesis processing is performed based on the video segment of interest and the original video to obtain a target video.

In a second aspect, an embodiment of the present disclosure further provides a video generation apparatus. The apparatus includes a capturing module, a determination module and a processing module. The capturing module is configured to receive a triggering operation acting on a video capturing interface and capture an original video in response to the triggering operation.

The determination module is configured to determine a video segment of interest in the original video.

The processing module is configured to perform video synthesis processing based on the video segment of interest and the original video to obtain a target video.

In a third aspect, an embodiment of the present disclosure further provides a device. The device includes at least one processor and a storage apparatus configured to store at least one program. When executed by the at least one processor, the at least one program causes the at least one processor to perform the video generation method according to any embodiment of the present disclosure.

In a fourth aspect, an embodiment of the present disclosure further provides a storage medium including computer-executable instructions which, when executed by a computer processor, are configured to cause the computer processor to perform the video generation method according to any embodiment of the present disclosure.

BRIEF DESCRIPTION OF DRAWINGS

The same or similar reference numerals in the drawings denote the same or similar elements. It is to be understood that the drawings are schematic, and that originals and elements are not necessarily drawn to scale.

FIG. 3 is a flowchart of a video generation method according to embodiment two of the present disclosure.

FIG. 4 is a flowchart of a video generation method according to embodiment three of the present disclosure.

DETAILED DESCRIPTION

Figure 1:
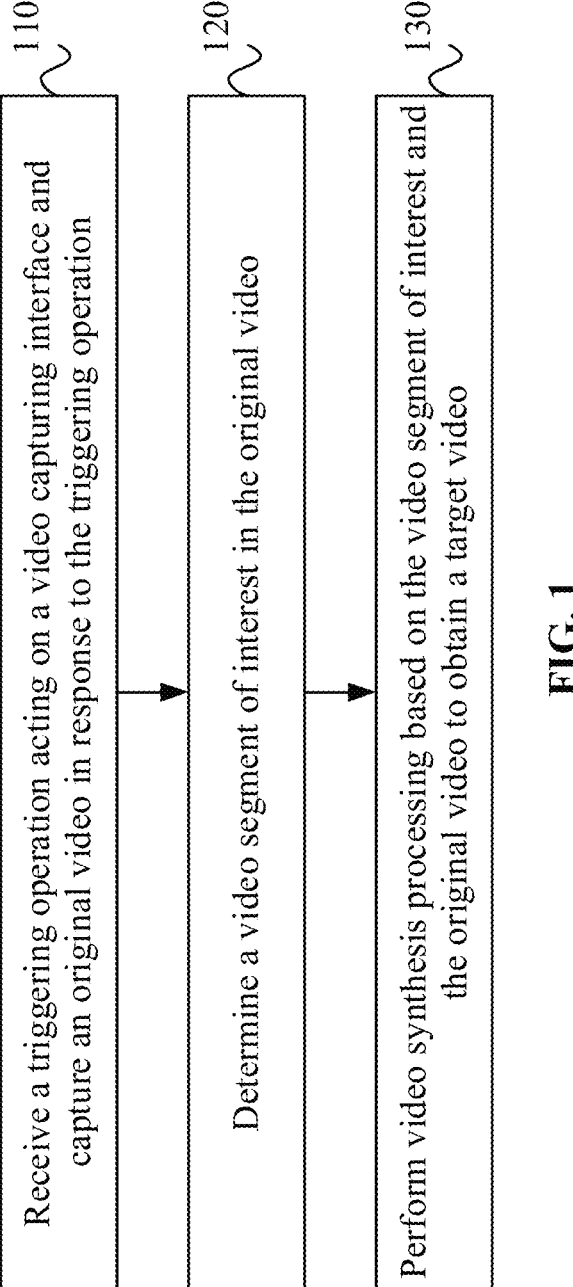
FIG. 1 is a flowchart of a video generation method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as being limited to the embodiments set forth herein. Conversely, these embodiments are provided so that the present disclosure can be thoroughly and completely understood. It is to be understood that the drawings and embodiments of the present disclosure are merely illustrative and are not intended to limit the scope of the present disclosure.

It is to be understood that the various steps recited in the method embodiments of the present disclosure may be performed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least one other embodiment". The term "some embodiments" means "at least some embodiments". Related definitions of other terms are provided in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that a modifier, "one" or "multiple", mentioned in the present disclosure is illustrative and non-restrictive, and those skilled in the art should understand that the modifier is to be interpreted as "at least one" unless otherwise clearly indicated in the context.

Embodiment One

FIG. 1 is a flowchart of a video generation method according to embodiment one of the present disclosure. The method is applicable to automatically editing and synthesizing an original video captured by a user to obtain a target video that has richer information and higher completion and is more wonderful, compared with the original video. The entire video generation process is automatically completed without the manual operation of the user so that the video processing effect and efficiency can be improved, the user experience can be improved, and the user stickiness of an application product can be enhanced. The video generation method may be executed by a video generation apparatus. The apparatus may be implemented in the form of software and/or hardware.

As shown in FIG. 1, the video generation method provided by this embodiment includes the steps below.

In S110, a triggering operation acting on a video capturing interface is received, and an original video is captured in response to the triggering operation.

A triggering operation acting on a target capturing control on the video capturing interface may be received, and the original video is captured in response to the triggering operation. For example, when the user clicks the target capturing control, a camera is started, and video capturing is performed on an image within the capturing range of the camera, and when the user clicks the target capturing control again, the capturing ends. The original video may be a video obtained by capturing the user or a video obtained by capturing a scene or an object.

Exemplarily, the original video includes a video obtained by capturing images in which the user performs a set task. The set task may be a task in any form, such as imitating a funny video by the user himself or the user and his friends, singing a song by the user, or doing a hot dance by the user.

Optionally, the set task may also include a tongue twister challenge game, and/or a game of questions and answers, and/or a video imitation game. The content and execution manner of the set task are not limited in this embodiment. For example, the user is required to clearly and fluently repeat a certain tongue twister within a limited time, and when the user repeats the tongue twister, video capturing is performed to record the user's real-time performances. Meanwhile, whether the user is clear and accurate in the words and consumes a shorter time than other users may also be analyzed based on the captured original video. Thus, the interest and entertainment of the game can be enhanced.

The set task may include at least one sub-task. Correspondingly, when the original video is captured, that is, the images in which the user performs the set task are captured, prompt information of the set task may be displayed on the video capturing interface to guide the user to perform the set task. In the case where the set task includes multiple sub-tasks, prompt information of the multiple sub-tasks may be sequentially displayed in a non-capturing region of the current interface according to difficulty degrees of the multiple sub-tasks. Exemplarily, the set task is a tongue twister, and the tongue twister includes two sub-tasks that are a first tongue twister and a second tongue twister respectively. The difficulty of the second tongue twister is greater than the difficulty of the first tongue twister, so the display order of prompt information of the first tongue twister on the video capturing interface is earlier than that of the second tongue twister. Thus, the user stickiness can be enhanced.

Correspondingly, when the prompt information of the first tongue twister is displayed on the video capturing interface, the user is guided to perform the first tongue twister task, and the images in which the user performs the first tongue twister task are simultaneously captured. Afterward, when the prompt information of the second tongue twister is displayed on the video capturing interface, the user is guided to perform the second tongue twister task, and the images in which the user performs the second tongue twister task are simultaneously captured.

Figure 2:
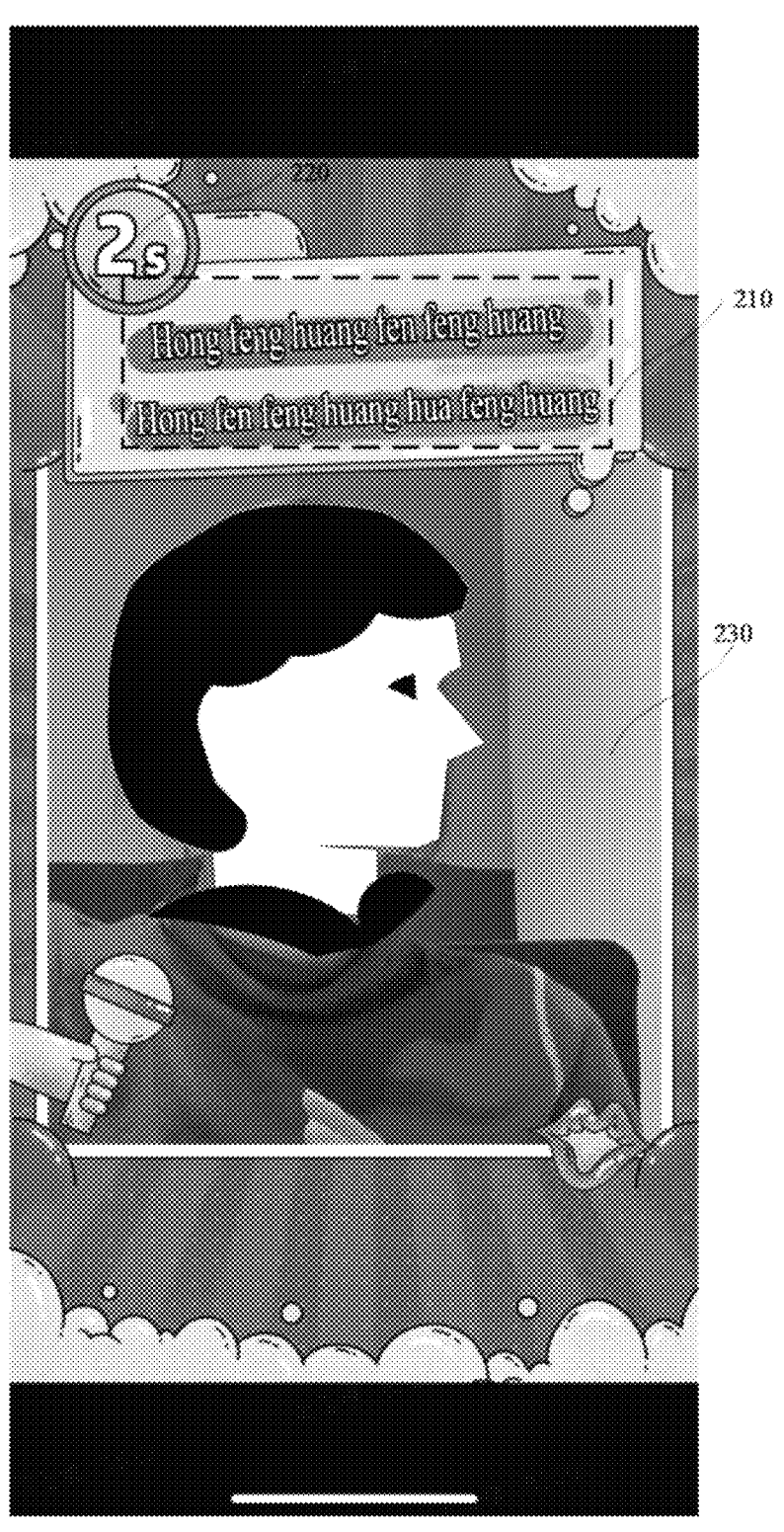
FIG. 2 is an interface view of video capturing when a user performs a set task according to embodiment one of the present disclosure.

The prompt information may include a name, an introduction and/or a countdown identification of the set task. Correspondingly, FIG. 2 is an interface view of video capturing when a user performs a set task. It may be seen that the content details "hong feng huang fen feng huang, hong fen feng huang hua feng huang" 210 and the countdown identification "2 s" 220 of the tongue twister are displayed in the non-capturing region of the current interface. The reference numeral 230 denotes a capturing region. When the user finishes repeating the current tongue twister, the content details and countdown identification of the next tongue twister that is more difficult are automatically displayed, such as "niu niu qian niu niu, niu niu la niu niu".

Generally, to reduce the development difficulty of the application and overhead of the system performance, the portrait mode is used for performing video capturing on the images in which the user performs the set task to obtain a portrait original video.

In S120, a video segment of interest in the original video is determined.

Exemplarily, the video segment of interest in the original video may refer to a video segment including a preset action of a body part. The preset action may also be an exaggerated action of the body part, such as clapping, waving or kicking which are exaggerated. Correspondingly, the video segment of interest may also be a video segment of an exaggerated action. Action recognition may be performed on each frame of image in the original video by an action recognition model, and an image frame including the preset action may be marked by dotting to acquire the video segment of interest based on the marked image frame. For example, a video segment composed of 20 image frames before and after a certain marked image frame is taken as the video segment of interest. The preset action is, for example, clapping, waving or kicking.

In S130, video synthesis processing is performed based on the video segment of interest and the original video to obtain a target video.

Optionally, images of some wonderful moments may be made by using the video segment of interest, then the images of some wonderful moments may be used as the intro or outro of the video, and a middle video having some animation effects may be generated by using the original video. Exemplarily, in conjunction with a set template, the original video may be played in the middle of the template, and some animation effects may be added in other positions of the template. For example, if the user repeats the current tongue twister clearly and fluently, the animation effect "you're awesome" may be displayed; and if the user repeats the current tongue twister not very clearly and fluently, the animation effect "keep trying" may be displayed, and a "microphone" in the form of animation may also be displayed. Finally, the intro, the middle and the outro that are obtained by processing are synthesized and spliced to obtain the target video.

To improve the video processing effect, the target video may be generated as a landscape video.

In the technical solution of this embodiment of the present disclosure, the triggering operation acting on the video capturing interface is received, and the original video is captured in response to the triggering operation, the video segment of interest in the original video is determined, and the video synthesis processing is performed based on the video segment of interest and the original video to obtain the target video, so that the automatic video editing and synthesis are achieved and the video processing effect is improved.

Embodiment Two

FIG. 3 is a flowchart of a video generation method according to embodiment two of the present disclosure. Based on the preceding embodiment, this embodiment refines the preceding S120 "the video segment of interest in the original video is determined" by providing an optional embodiment of determining the video segment of interest. The same or similar contents as the preceding embodiment are not repeated in this embodiment and may be referred to the explanation of the preceding embodiment.

As shown in FIG. 3, the method includes the steps below.

In S310, the triggering operation acting on the video capturing interface is received, and the original video is captured in response to the triggering operation.

In S320, the video segment of interest in the original video is determined based on image recognition.

Exemplarily, the action recognition is performed on image frames of the original video based on the action recognition model, and a timestamp of each first image frame of at least one first image frame including the preset action and an action score corresponding to the each first image frame are recorded, a first image frame whose action score reaches a set threshold is determined as a second image frame, and the video segment of interest is acquired according to a timestamp of the second image frame.

The action recognition model may be an algorithm which is constructed based on the neural network and implemented by the principle of image recognition and used for recognizing actions in an image. Exemplarily, each image frame of the original video is sequentially input into the action recognition model, and the action recognition model outputs a recognition result about whether the preset action is included, and a corresponding action score. For example, if the recognition result is "1", this represents that the current image frame includes the preset action.

The action score is a measure used for representing the degree of change in an action. For example, the action score of a smaller range of change is lower than the action score of a greater range of change. A reference for obtaining the video segment of interest is provided by recording the timestamps of the first image frames including the preset action. In the stage of obtaining the video segment of interest, an image frame having a relatively high action score may be selected as the reference by recording the action score of each first image frame, which is conductive to acquire a wonderful video segment.

Optionally, that the video segment of interest is acquired according to the timestamp of the second image frame includes the step below.

By using the timestamp of the second image frame as a reference time point, a video having a set duration within a duration range of a task corresponding to the second image frame is taken as the video segment of interest. For example, that the set task includes one sub-task is used as an example. The sub-task is the tongue twister "hong feng huang fen feng huang, hong fen feng huang hua feng huang", and the default time for the user to repeat the tongue twister is 5 s as specified. Assuming that the time for the user to start repeating the tongue twister is 1st s, the duration range of the sub-task is 1st s to 5th s, the timestamp of the second image frame is 3rd s, and the duration of the video segment of interest is 1 s, so the 3rd s is used as the reference point. Image frames within 0.5 s before and after the reference point form the video segment of interest. That is, image frames whose timestamps fall within 2.5th s to 3.5th s are determined as the image frames of the video segment of interest. Assuming that the timestamp of the second image frame is 4.7th s, if the timestamp is taken backward for 0.5 s (that is, 5.2th s), the duration range (1st s to 5th s) of the sub-task is exceeded. In this case, image frames whose timestamps fall within 4th s to 5th s are taken as the image frames of the video segment of interest. That is, by using the timestamp of the second image frame as the reference time point, the set number of image frames close to the second image frame within the duration range of the task corresponding to the second image frame are determined as video segments of interest. Additionally, for each sub-task, multiple second image frames may be provided. In this case, video segments of interest may be respectively determined according to the multiple second image frames and then are synthesized as the final video segment of interest of the each sub-task.

When the set task includes multiple sub-tasks, a video segment of interest may also be respectively determined for each sub-task and then is synthesized as the final video segment of interest of the set task. The manner of determining the video segment of interest for the each sub-task is similar to the preceding and therefore is not repeated herein.

In S330, the video synthesis processing is performed based on the video segment of interest and the original video to obtain the target video.

In the technical solution of this embodiment of the present disclosure, the action recognition is performed on the image frames of the original video based on the action recognition model, and the timestamp of the each first image frame including the preset action and the action score corresponding to the each first image frame are recorded, the first image frame whose action score reaches the set threshold is determined as the second image frame, and by using the timestamp of the second image frame as the reference time point, the set number of image frames close to the second image frame within the duration range of the current set task are determined as the video segments of interest. Thus, the video segments of interest can be precisely determined, and a data basis can be provided for obtaining the target video.

Embodiment Three

FIG. 4 is a flowchart of a video generation method according to embodiment three of the present disclosure. Based on the preceding embodiments, this embodiment refines the preceding S130 "the video synthesis processing is performed based on the video segment of interest and the original video to obtain the target video" by providing an optional embodiment of video editing and synthesis processing. The same or similar contents as the preceding embodiments are not repeated in this embodiment and may be referred to the explanations of the preceding embodiments.

As shown in FIG. 4, the method includes the steps below.

In S410, the triggering operation acting on the video capturing interface is received, and the original video is captured in response to the triggering operation.

In S420, the video segment of interest in the original video is determined.

In S430, intro video data and/or outro video data are generated based on the video segment of interest, and middle video data is generated based on the original video.

Exemplarily, that the intro video data is generated based on the video segment of interest includes the step below.

The intro video data is generated based on the video segment of interest and a first preset template.

For example, the video segment of interest is added to a first set position of the first preset template to play the video segment of interest at the first set position.

Figure 5:
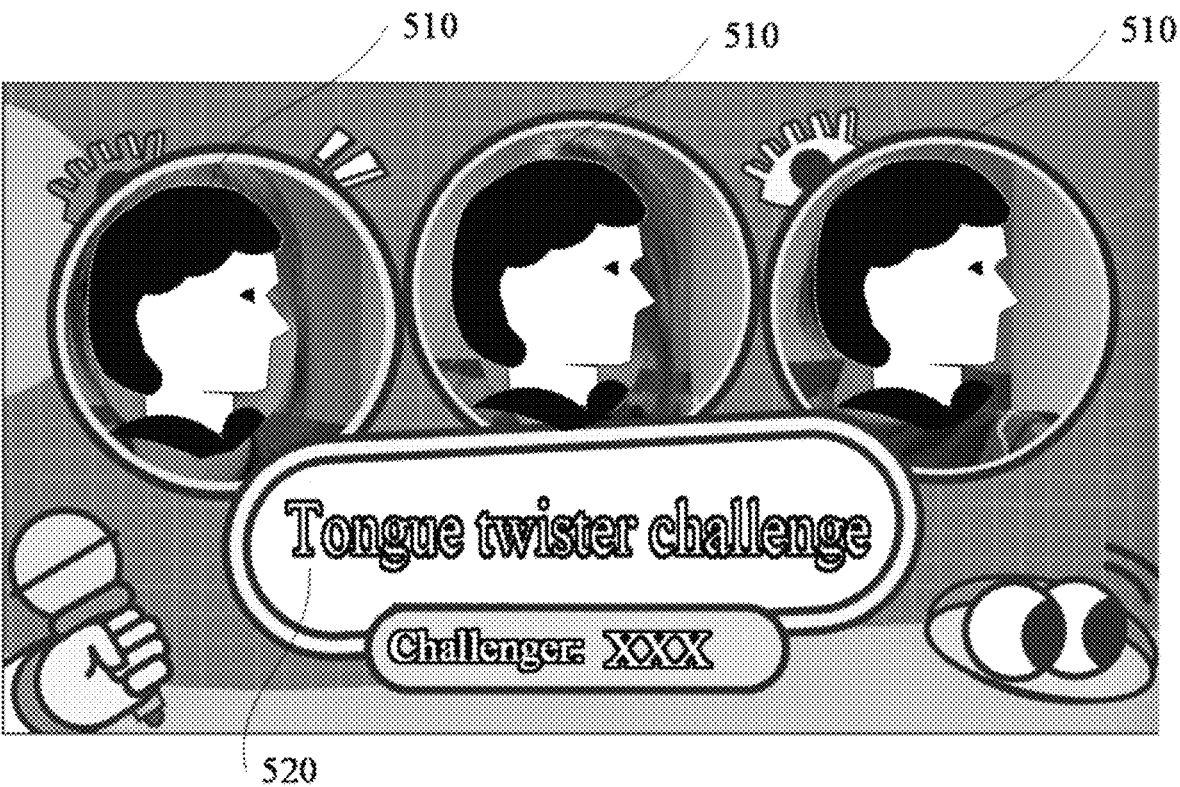
FIG. 5 is a view of an animation image interface in the intro of a video according to embodiment three of the present disclosure.
Figure 6A:
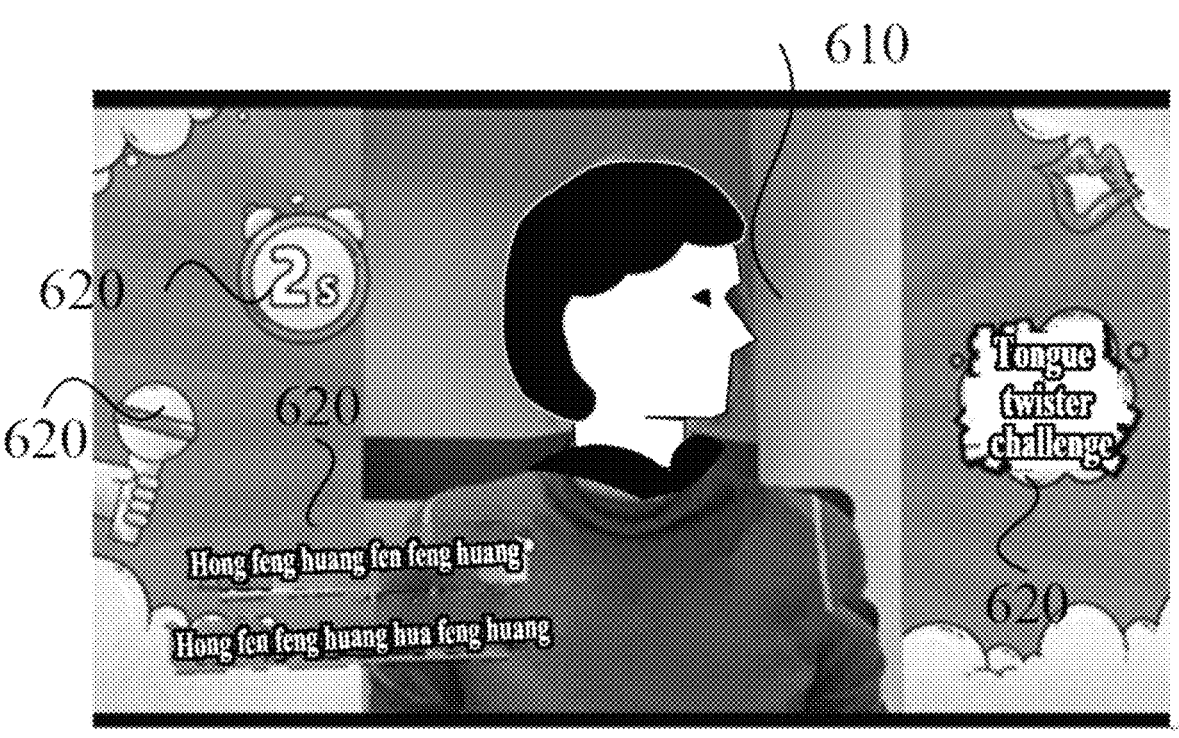
FIGS. 6A to 6E are views of animation image interfaces in a video according to embodiment three of the present disclosure.
Figure 6B:
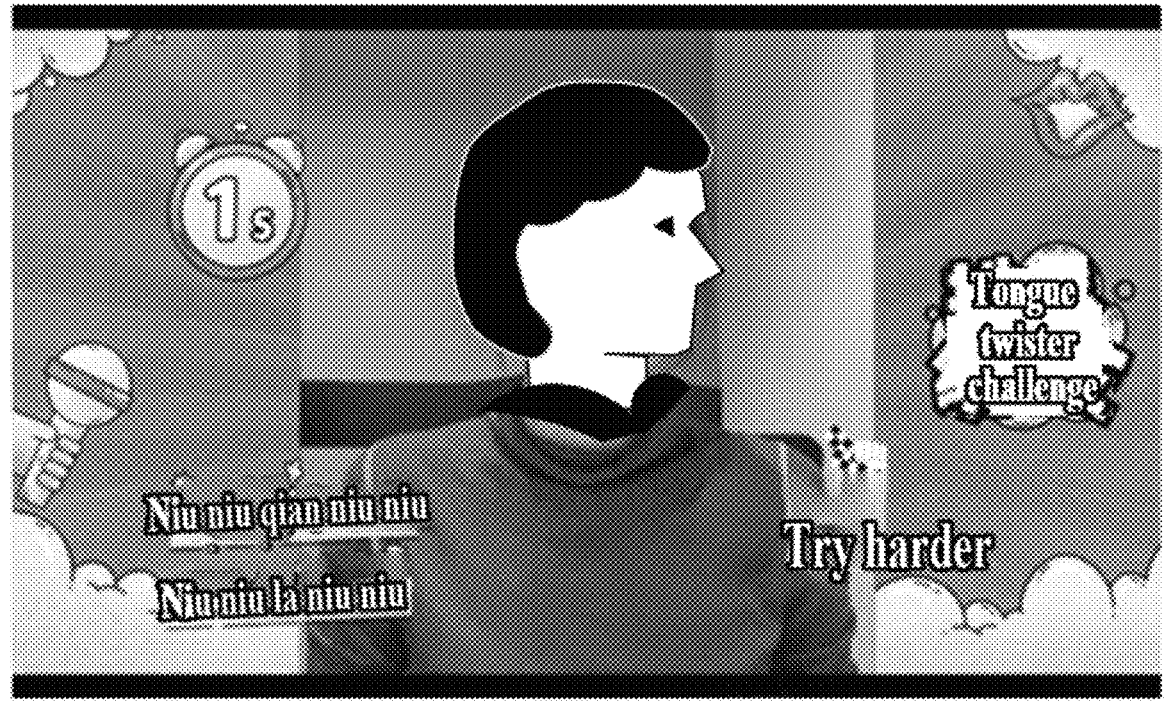
Figure 6C:
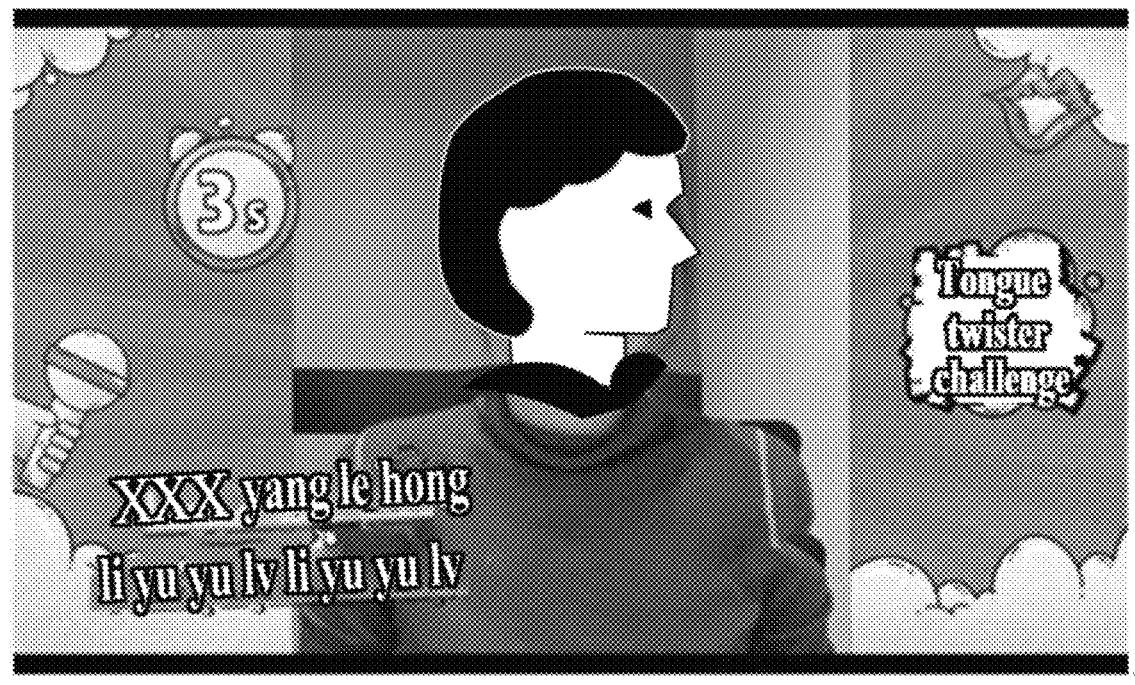
Figure 6D:
Figure 6E:
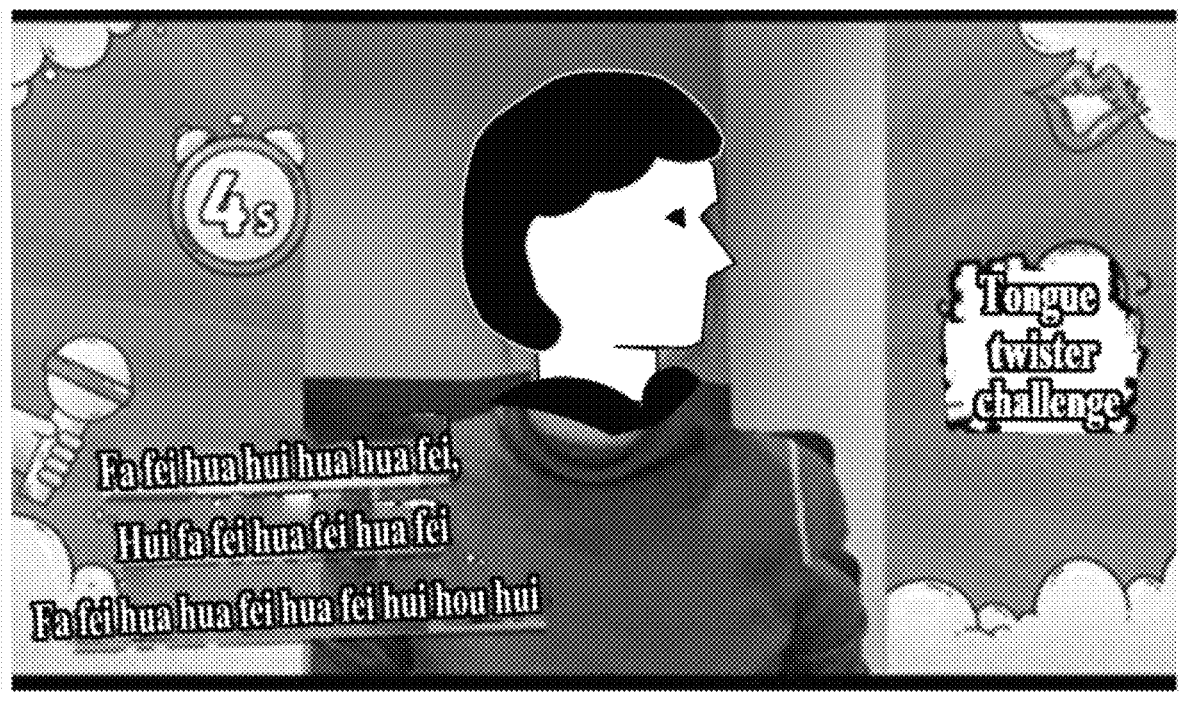

Identification (such as a serial number, a name, or an introduction) information of the set task and/or an identification (such as a nickname) of the user are displayed at a second set position of the first preset template to obtain the intro video data. FIG. 5 is a view of an animation image interface in the intro of a video. The video segment of interest (a small video of about 1 s) is added to the first set position 510 (the position of three circles) of the first preset template, and introduction information (such as tongue twister challenge) of the set task and/or the nickname of the user (as shown in FIG. 5: challenger: XXX) are displayed at the second set position 520 of the first preset template.

Moreover/alternatively, that the middle video data is generated based on the original video includes the step below.

The middle video data is generated based on the original video and a second preset template.

Exemplarily, the original video is added to a third set position of the second preset template to play the original video at the third set position; a matching animation is displayed at a fourth set position of the second preset template according to the performance of the user in the set task, and/or associated information of the set task is displayed at a fifth set position of the second preset template according to the content of the set task; and the middle video data is thus generated.

Exemplarily, when the set task includes multiple sub-tasks, the original video correspondingly includes multiple partial videos, each partial video corresponds to one sub-task, and a partial video in which the user performs a single set task (that is, a sub-task) may be determined based on the original video. For example, the original video is a video in which the user challenges tongue twisters. In the video, the user challenges four tongue twisters in total, and the user first challenges a relatively simple tongue twister before a relatively difficult tongue twister based on a difficulty degree of each tongue twister. For example, the user first challenges the tongue twister "hong feng huang fen feng huang, hong fen feng huang hua feng huang", and when the user finishes repeating the current tongue twister, the next relatively difficult tongue twister such as "niu niu qian niu niu, niu niu la niu niu" is automatically displayed; the user then challenges the third tongue twister such as "XXX yang le hong li yu yu lv li yu yu lv"; and the user finally challenges the fourth tongue twister such as "lan jiao Tian shi nv jiao Tian, lv jiao Tian shi nan jiao Tian". The video in which the user challenges each tongue twister is determined as the partial video in which the user performs a sub-task. For example, the video in which the user repeats the tongue twister "hong feng huang fen feng huang, hong fen feng huang hua feng huang" is a partial video, and the video in which the user repeats the tongue twister "niu niu qian niu niu, niu niu la niu niu" is another partial video.

The multiple partial videos are added to third set positions of corresponding second preset templates respectively to play the multiple partial videos at the third set positions of the corresponding second preset templates, where each partial video corresponds to an independent second preset template; matching animations are displayed at fourth set positions of the corresponding second preset templates according to the performance of the user in the set task; and associated information of a respective sub-task is displayed at the fifth set position of the each second preset template to obtain the middle video data.

Exemplarily, FIGS. 6A to 6E are views of animation image interfaces in a video. The multiple partial videos are added to the third set positions 610 (the middle positions of the second preset templates) of the corresponding second preset templates respectively to play the multiple partial videos at the third set positions 610 of the corresponding second preset templates. The associated information of the respective sub-task is displayed at the fifth set position 620 of the each second preset template. The associated information includes at least one of: the content detailed information (such as "hong feng huang fen feng huang, hong fen feng huang hua feng huang" in FIG. 6A, "niu niu qian niu niu, niu niu la niu niu" in FIG. 6B, "XXX yang le hong li yu yu lv li yu yu lv" in FIG. 6C, "lan jiao Tian shi nv jiao Tian, lv jiao Tian shi nan jiao Tian" in FIG. 6D, or "fa fei hua hui hua hua fei, hui fa fei hua fei hua fei, fa fei hua hua fei hua fei hui hou hui" in FIG. 6E) of the each sub-task, a microphone, a countdown reminder identification, or a game category to which the set task belongs, such as the "tongue twister challenge" in FIGS. 6A to 6E. The content information, microphone, countdown reminder identification and game category may be each added to the set positions 620 of the each second preset template in the form of informationalized sticker, for example, the positions on the left and right sides of the each second preset template. Meanwhile, a special effect may also be added according to the information content. For example, when the information content is "liu nai nai ai he liu Tian niu nai", a sticker having a rendering effect may be added, such as the sticker of "milk" image. The each tongue twister has a completion time set by the system, and a countdown stopwatch may be correspondingly displayed.

Optionally, that the matching animation is displayed at the fourth set position of the second preset template according to the performance of the user in the set task includes at least one of the following.

When the user speaks a preset word, an animation matching the preset word is displayed at the fourth set position. For example, when the user speaks "fa hei" in "hua fei hui fa hui fa hei", an animation effect of "set body part turns into a black one" is displayed at the fourth set position of the second preset template. The fourth set position may be a position in which the user's set body part image is displayed, that is, the set body part turns into a black one, so as to enhance the animation effect and improve the interest.

Alternatively, when the user makes a set action, an animation matching the set action is displayed at the fourth set position. For example, when the user waves, a large-hand special effect is displayed at the fourth set position to achieve the effect of enlarging an action of the hand. The fourth set position may be a position in which the user's set body part image is displayed, that is, a large-hand special effect is added to the set body part to enlarge the user's hand action so as to enhance the animation effect and improve the interest.

Alternatively, according to the accuracy of the set task performed by the user, an animation matching the accuracy is displayed at the fourth set position. For example, when the user finishes repeating the each tongue twister, the accuracy and completeness of the user's repetition are determined by voice recognition, and an evaluation is provided according to the accuracy and completeness. For example, words such as "perfect", "excellent", "average", or "keep trying" are displayed in the form of animation.

Moreover/alternatively, that the outro video data is generated based on the video segment of interest includes the step below.

The outro video data is generated based on the video segment of interest and a third preset template.

Exemplarily, that the outro video data is generated based on the video segment of interest and the third preset template includes the steps below.

An image of the set body part is taken based on the video segment of interest.

The image of the set body part is added to a sixth set position of the third preset template to display the image of the set body part at the sixth set position.

Figure 7:
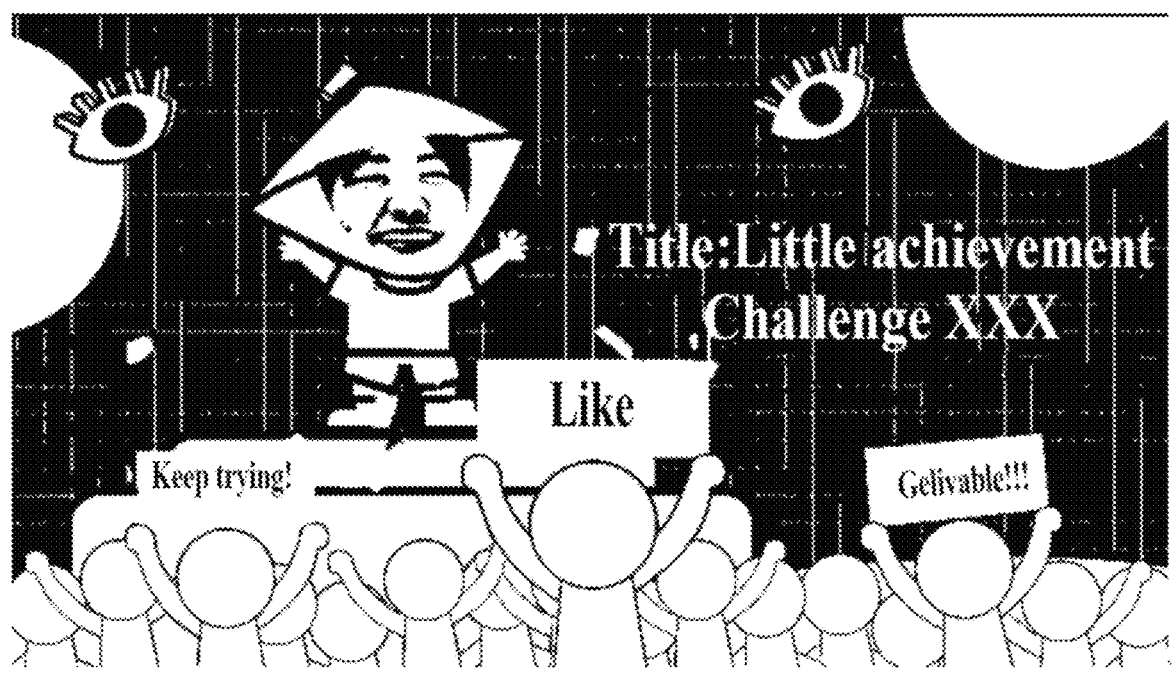
FIG. 7 is a view of an animation image interface in an outro of a video according to embodiment three of the present disclosure.

Matching content is displayed at a seventh set position of the third preset template according to the performance of the user in the set task. The matching content includes at least one of: title information or compliment information that matches the performance of the user in the set task. FIG. 7 is a view of an outro video data image. In the third preset template, the image of the set body part is displayed at the sixth set position, and the title information "little achievement" and the compliment information "like", "keep trying" and "gelivable" are displayed at the seventh set position.

In S440, the middle video data and at least one of the intro video data or the outro video data are spliced to generate the target video.

Optionally, the intro video data is generated based on the video segment of interest, and then the intro video data and the original video are spliced and synthesized to obtain the target video; the outro video data may also be generated based on the video segment of interest, and then the outro video data and the original video are spliced and synthesized to obtain the target video; and the intro video data and the outro video data may also be separately generated based on the video segment of interest, and then the intro video data, the original video and the outro video data are spliced and synthesized to obtain the target video. To improve the video processing degree and effect, the intro video data and the outro video data may be separately generated based on the video segment of interest, the middle video data is generated based on the original video, and then the intro video data, the middle video data and the outro video data are spliced and synthesized to obtain the target video.

In the technical solution of this embodiment, the intro video data is generated based on the video segment of interest and the first preset template, for example, funny actions, such as waving and kicking, are added to the first set position of the first preset template, and information such as the introduction information of associated game props and the nickname of a challenging user is displayed at the second set position; the middle video data is generated based on the original video and the second preset template; the outro video data is generated based on the video segment of interest and the third preset template; and the intro video data, the middle video data and the outro video data are spliced and synthesized to obtain the target video. Thus, the mixture and synthesis processing of videos can be achieved, the video processing effect can be improved, the target video that has a higher completion degree and is more wonderful can be obtained, the interest can be enhanced, and the user experience can be improved.

Embodiment Four

Figure 8:
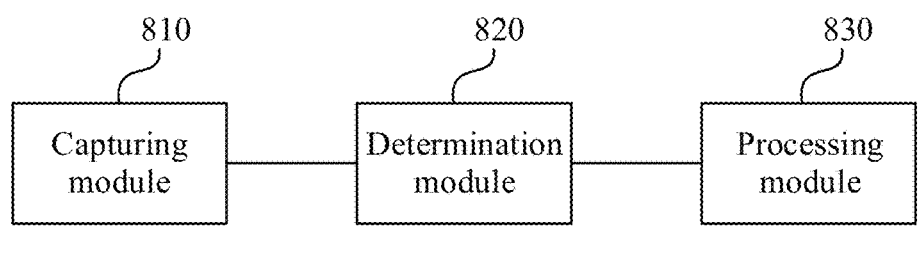
FIG. 8 is a diagram illustrating the structure of a video generation apparatus according to embodiment four of the present disclosure.

FIG. 8 shows a video generation apparatus according to embodiment four of the present disclosure. The apparatus includes a capturing module 810, a determination module 820 and a processing module 830.

The capturing module 810 is configured to receive a triggering operation acting on a video capturing interface and capture an original video in response to the triggering operation. The determination module 820 is configured to determine a video segment of interest in the original video. The processing module 830 is configured to perform video synthesis processing based on the video segment of interest and the original video to obtain a target video.

Based on the preceding technical solutions, the original video includes a video obtained by capturing images in which a user performs a set task, so the apparatus further correspondingly includes a display module.

The display module is configured to, in response to the triggering operation, display prompt information on the video capturing interface to guide the user to perform the set task.

Based on the preceding technical solutions, the display module is configured to sequentially display prompt information of set tasks on the video capturing interface according to the difficulty degrees of the set tasks.

Based on the preceding technical solutions, the determination module 820 is configured to determine the video segment of interest in the original video based on image recognition.

Based on the preceding technical solutions, the determination module 820 includes a recognition recording unit and an acquisition unit. The recognition recording unit is configured to perform action recognition on image frames of the original video based on an action recognition model and record a timestamp of each first image frame of at least one first image frame including a preset action and an action score corresponding to the each first image frame.

The acquisition unit is configured to determine a first image frame whose action score reaches a set threshold as a second image frame and acquire the video segment of interest according to a timestamp of the second image frame.

Based on the preceding technical solutions, the acquisition unit is configured to take a video having a set duration within a duration range of the current set task as the video segment of interest by using the timestamp of the second image frame as a reference time point.

Based on the preceding technical solutions, the processing module 830 includes a first generation unit, a second generation unit and a splicing unit.

The first generation unit is configured to generate intro video data and/or outro video data based on the video segment of interest.

The second generation unit is configured to generate middle video data based on the original video.

The splicing unit is configured to splice at least one of the intro video data or the outro video data with the middle video data to generate the target video.

Based on the preceding technical solutions, the first generation unit includes a first generation subunit, a second generation subunit and a third generation subunit.

The first generation subunit is configured to generate the intro video data based on the video segment of interest and a first preset template.

Moreover/alternatively, the second generation subunit is configured to generate the middle video data based on the original video and a second preset template.

Moreover/alternatively, the third generation subunit is configured to generate the outro video data based on the video segment of interest and a third preset template.

Based on the preceding technical solutions, the first generation subunit is configured to add the video segment of interest to a first set position of the first preset template to play the video segment of interest at the first set position of the first preset template; and display introduction information of the set task and/or an identification of the user at a second set position of the first preset template to obtain the intro video data.

Based on the preceding technical solutions, the second generation subunit is configured to add the original video to a third set position of the second preset template to play the original video at the third set position; display a matching animation at a fourth set position of the second preset template according to a condition of the set task performed by the user and/or display associated information of the set task at a fifth set position of the second preset template according to content of the set task; and thus generate the middle video data.

Based on the preceding technical solutions, the associated information includes at least one of: content detailed information of a single set task, a microphone, a countdown reminder identification, or a game category to which the single set task belongs.

Based on the preceding technical solutions, that the matching animation is displayed at the fourth set position of the second preset template according to the performance of the user in the set task includes at least one of the following.

When the user speaks a preset word, an animation matching the preset word is displayed at the fourth set position.

Alternatively, when the user makes a set action, an animation matching the set action is displayed at the fourth set position.

Alternatively, according to the accuracy of the set task performed by the user, an animation matching the accuracy is displayed at the fourth set position of the second preset template.

Based on the preceding technical solutions, the third generation subunit is configured to take an image of the set body part based on the video segment of interest; add the image of the set body part to a sixth set position of the third preset template to display the image of the set body part at the sixth set position; and display matching content at a seventh set position of the third preset template according to the performance of the user in the set task.

Based on the preceding technical solutions, the matching content includes at least one of: title information or compliment information that matches the performance of the user in the set task.

Based on the preceding technical solutions, the set task includes a tongue twister challenge game and/or a game of questions and answers.

Based on the preceding technical solutions, the original video includes a portrait video, and the target video includes a landscape video.

In the technical solution of this embodiment of the present disclosure, the triggering operation acting on the video capturing interface is received, and the original video is captured in response to the triggering operation; the video segment of interest in the original video is determined; and the video synthesis processing is performed based on the video segment of interest and the original video to obtain the target video. Thus, the automatic video editing and synthesis can be achieved, and the video processing effect can be improved.

The video generation apparatus provided by this embodiment of the present disclosure may perform the video generation method provided by any embodiment of the present disclosure and has functional modules corresponding to the execution method.

It is to be noted that units and modules included in the preceding apparatus are only divided according to function logic, but are not limited to such division, as long as the corresponding functions can be achieved. Additionally, the names of function units are only used for distinguishing between each other and are not intended to limit the scope of embodiments of the present disclosure.

Embodiment Five

Figure 9:
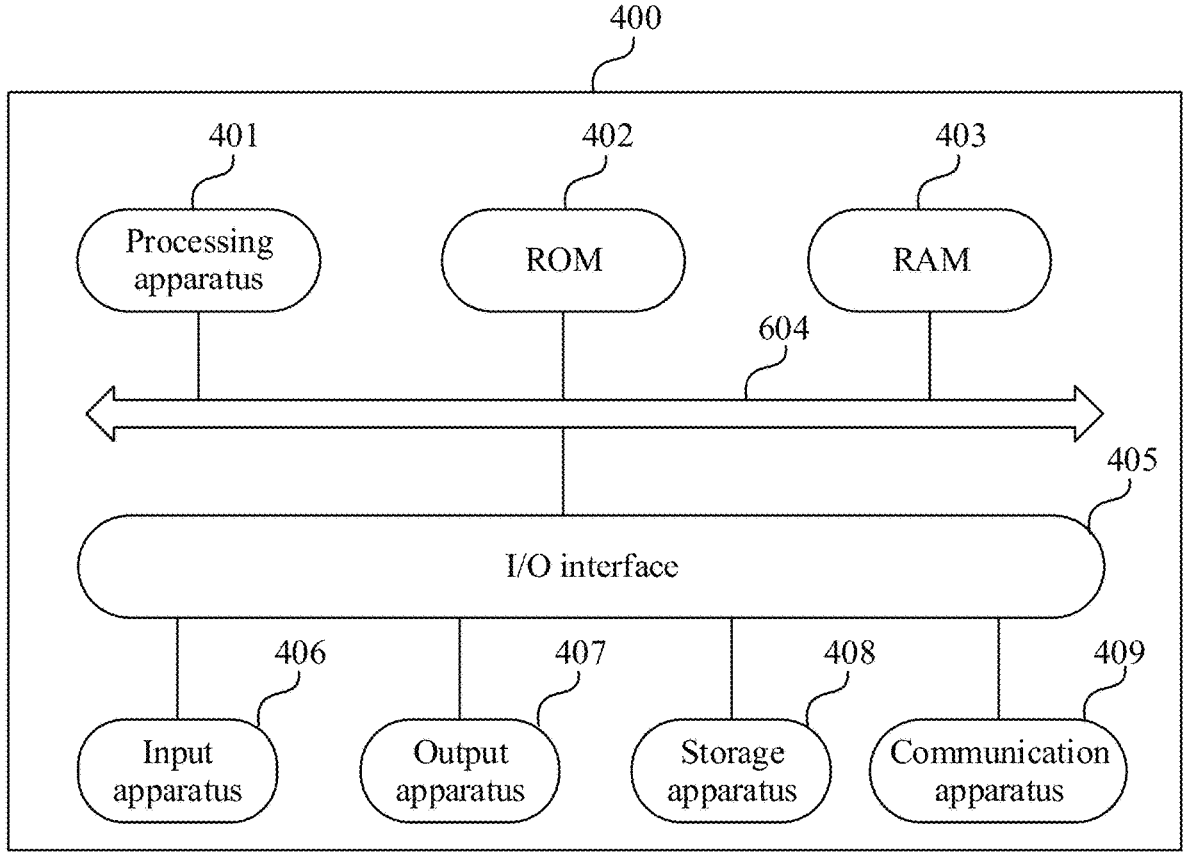
FIG. 9 is a diagram illustrating the structure of an electronic device according to embodiment five of the present disclosure.

FIG. 9 is a diagram illustrating the structure of an electronic device 400 (such as a terminal device or a server in FIG. 9) applicable to implementing the embodiments of the present disclosure. The terminal device in this embodiment of the present disclosure may include, but is not limited to, a mobile terminal such as a mobile phone, a laptop, a digital broadcast receiver, a personal digital assistant (PDA), a tablet computer (Pad), a portable media player (PMP), or an in-vehicle terminal (such as an in-vehicle navigation terminal) and a stationary terminal such as a digital television (TV) or a desktop computer. The electronic device shown in FIG. 9 is merely an example and is not intended to limit the function and use scope of this embodiment of the present disclosure.

As shown in FIG. 9, the electronic device 400 may include a processing apparatus 401 (such as a central processing unit or a graphics processing unit). The processing apparatus 401 may perform various appropriate actions and processing according to a program stored in a read-only memory (ROM) 402 or a program loaded into a random-access memory (RAM) 403 from a storage apparatus 406. Various programs and data required for operations of the electronic device 400 are also stored in the RAM 403. The processing apparatus 401, the ROM 402 and the RAM 403 are connected to each other through a bus 404. An input/output (I/O) interface 405 is also connected to the bus 404.

Generally, the following apparatuses may be connected to the I/0 interface 405: an input apparatus 406 such as a touch screen, a touchpad, a keyboard, a mouse, a camera, a microphone, an accelerometer, or a gyroscope; an output apparatus 407 such as a liquid crystal display (LCD), a speaker, or a vibrator; the storage apparatus 406 such as a magnetic tape or a hard disk; and a communication apparatus 409. The communication apparatus 409 may allow the electronic device 400 to perform wireless or wired communication with other devices to exchange data.

Although FIG. 9 shows the electronic device 400 having various apparatuses, it is to be understood that it is not required to implement or have all the shown apparatuses. Alternatively, more or fewer apparatuses may be implemented or available.

Particularly, according to this embodiment of the present disclosure, the processes described in the preceding with reference to the flowcharts may be implemented as computer software programs. For example, a computer program product is provided in this embodiment of the present disclosure. The computer program product includes a computer program carried on a non-transitory computer-readable medium. The computer program includes program codes for performing the methods illustrated in the flowcharts. In such an embodiment, the computer program may be downloaded and installed from a network through the communication apparatus 409, installed from the storage apparatus 406, or installed from the ROM 402. When executed by the processing apparatus 401, the computer program causes the processing apparatus 401 to perform the preceding functions defined in the methods in embodiments of the present disclosure. The terminal provided by this embodiment of the present disclosure and the video generation methods provided by the preceding embodiments belong to the same concept. For technical details not described in this embodiment, reference may be made to the preceding embodiments.

Embodiment Six

An embodiment of the present disclosure provides a computer storage medium storing a computer program which, when executed by a processor, causes the processor to perform the video generation methods according to the preceding embodiments.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus, or device or any combination thereof. More specific examples of the computer-readable storage medium may include, but are not limited to, an electrical connection having at least one wire, a portable computer disk, a hard disk, a random access memory (RAM), a read-only memory (ROM), an erasable programmable read-only memory (EPROM) or a flash memory, an optical fiber, a portable compact disc read-only memory (CD-ROM), an optical memory device, a magnetic memory device, or any suitable combination thereof In the present disclosure, the computer-readable storage medium may be any tangible medium including or storing a program that can be used by or in connection with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate or transmit a program used by or in connection with an instruction execution system, apparatus, or device. Program codes included on the computer-readable medium may be transmitted by any suitable medium, including, but not limited to, a wire, an optical cable, a radio frequency (RF), or any suitable combination thereof.

In some embodiments, clients and servers may communicate using any currently known or future developed network protocol such as the HyperText Transfer Protocol (HTTP), and may be interconnected with any form or medium of digital data communication (such as a communication network). Examples of the communication network include a local area network (LAN), a wide area network (WAN), an interne (such as the Internet), a peer-to-peer network (such as an Ad-Hoc network), and any currently known or future developed network.

The preceding computer-readable medium may be included in the preceding electronic device or may exist alone without being assembled into the electronic device.

The preceding computer-readable medium carries at least one program which, when executed by the electronic device, causes the electronic device to perform the steps below.

A triggering operation acting on a video capturing interface is received, and an original video is captured in response to the triggering operation.

A video segment of interest in the original video is determined.

Video synthesis processing is performed based on the video segment of interest and the original video to obtain a target video.

Computer program codes for performing the operations in the present disclosure may be written in at least one programming language or a combination thereof. The preceding at least one programming language includes, but is not limited to, an object-oriented programming language such as Java, Smalltalk and C++, as well as a conventional procedural programming language such as "C" or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, program segment, or part of codes, where the module, program segment, or part of codes includes at least one executable instruction for implementing specified logical functions. It is also to be noted that in some alternative implementations, the functions marked in the blocks may occur in an order different from that marked in the drawings. For example, two successive blocks may, in practice, be executed substantially in parallel or executed in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The name of a unit is not intended to limit the unit in a certain circumstance. For example, an editable content display unit may also be described as an "editing unit".

The functions described in the preceding herein may be at least partially implemented by at least one hardware logic component. For example, without limitation, example types of the hardware logic component that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program used by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus, or device, or any appropriate combination thereof. More specific examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device, or any suitable combination thereof.

According to at least one embodiment of the present disclosure, example one provides a video generation method. The method includes the steps below.

A triggering operation acting on a video capturing interface is received, and an original video is captured in response to the triggering operation.

A video segment of interest in the original video is determined.

Video synthesis processing is performed based on the video segment of interest and the original video to obtain a target video.

According to at least one embodiment of the present disclosure, example two provides a video generation method. Optionally, the original video includes a video obtained by capturing images in which a user performs a set task.

The method further includes the step below.

In response to the triggering operation, prompt information is displayed on the video capturing interface to guide the user to perform the set task.

According to at least one embodiment of the present disclosure, example three provides a video generation method. Optionally, that the video segment of interest in the original video is determined includes the step below.

The video segment of interest in the original video is determined based on image recognition.

According to at least one embodiment of the present disclosure, example four provides a video generation method. Optionally, that the video segment of interest in the original video is determined based on the image recognition includes the steps below.

Action recognition is performed on image frames of the original video based on an action recognition model, and a timestamp of each first image frame of at least one first image frame including a preset action and an action score corresponding to the each first image frame are recorded.

A first image frame whose action score reaches a set threshold is determined as a second image frame.

The video segment of interest is acquired according to a timestamp of the second image frame.

According to at least one embodiment of the present disclosure, example five provides a video generation method. Optionally, that the video segment of interest is acquired according to the timestamp of the second image frame includes the step below.

By using the timestamp of the second image frame as a reference time point, a video having a set duration within a duration range of a task corresponding to the second image frame is taken as the video segment of interest.

According to at least one embodiment of the present disclosure, example six provides a video generation method. Optionally, that the video synthesis processing is performed based on the video segment of interest and the original video to obtain the target video includes the steps below.

Opening video data and/or outro video data are generated based on the video segment of interest.

Middle video data is generated based on the original video.

The middle video data and at least one of the intro video data or the outro video data are spliced to generate the target video.

According to at least one embodiment of the present disclosure, example seven provides a video generation method. Optionally, the method includes the steps below.

That the intro video data is generated based on the video segment of interest includes that the intro video data is generated based on the video segment of interest and a first preset template.

Moreover/alternatively, that the middle video data is generated based on the original video includes that the middle video data is generated based on the original video and a second preset template. Moreover/alternatively, that the outro video data is generated based on the video segment of interest includes that the outro video data is generated based on the video segment of interest and a third preset template.

According to at least one embodiment of the present disclosure, example eight provides a video generation method. Optionally, the method includes the steps below.

That the intro video data is generated based on the video segment of interest and the first preset template includes the steps below.

The video segment of interest is added to a first set position of the first preset template to play the video segment of interest at the first set position of the first preset template.

Introduction information of the set task and/or identification information of the user are displayed at a second set position of the first preset template.

Thus, the intro video data is generated.

According to at least one embodiment of the present disclosure, example nine provides a video generation method. Optionally, that the middle video data is generated based on the original video and the second preset template includes the steps below.

The original video is added to a third set position of the second preset template to play the original video at the third set position.

A matching animation is displayed at a fourth set position of the second preset template according to a condition of the set task performed by the user, and/or associated information of the set task is displayed at a fifth set position of the second preset template according to content of the set task.

Thus, the middle video data is generated.

According to at least one embodiment of the present disclosure, example ten provides a video generation method. Optionally, that the matching animation is displayed at the fourth set position of the second preset template according to the performance of the user in the set task includes at least one of the following.

When the user speaks a preset word, an animation matching the preset word is displayed at the fourth set position.

Alternatively, when the user makes a set action, an animation matching the set action is displayed at the fourth set position.

Alternatively, according to the accuracy of the set task performed by the user, an animation matching the accuracy is displayed at the fourth set position.

According to at least one embodiment of the present disclosure, example eleven provides a video generation method. Optionally, that the outro video data is generated based on the video segment of interest and the third preset template includes the steps below.

An image of the set body part is taken based on the video segment of interest.

The image of the set body part is added to a sixth set position of the third preset template to display the image of the set body part at the sixth set position. According to a task completion degree of the user, matching content corresponding to the completion degree is displayed at a seventh set position of the third preset template.

Thus, the outro video data is generated.

According to at least one embodiment of the present disclosure, example twelve provides a video generation method. Optionally, the original video includes a portrait video, and the target video includes a landscape video.

According to at least one embodiment of the present disclosure, example thirteen provides a video generation apparatus. The apparatus includes a capturing module, a determination module and a processing module.

The capturing module is configured to receive a triggering operation acting on a video capturing interface and capture an original video in response to the triggering operation.

The determination module is configured to determine a video segment of interest in the original video.

The processing module is configured to perform video synthesis processing based on the video segment of interest and the original video to obtain a target video.

According to at least one embodiment of the present disclosure, example fourteen provides an electronic device.

The electronic device includes at least one processor and a storage apparatus configured to store at least one program.

When executed by the at least one processor, the at least one program causes the at least one processor to perform a video generation method below.

A triggering operation acting on a video capturing interface is received, and an original video is captured in response to the triggering operation.

A video segment of interest in the original video is determined.

Video synthesis processing is performed based on the video segment of interest and the original video to obtain a target video.

According to at least one embodiment of the present disclosure, example fifteen provides a storage medium including computer-executable instructions which, when executed by a computer processor, are configured to cause the computer processor to perform a video generation method below.

A triggering operation acting on a video capturing interface is received, and an original video is captured in response to the triggering operation.

A video segment of interest in the original video is determined.

Video synthesis processing is performed based on the video segment of interest and the original video to obtain a target video.

Additionally, though operations are depicted in a particular order, this should not be construed as that these operations are required to be performed in the particular order shown or in a sequential order. Under certain circumstances, multitasking and parallel processing may be advantageous.

Similarly, though several specific implementation details are included in the preceding discussion, these should not be construed as limitations on the scope of the present disclosure. Certain features described in the context of separate embodiments may also be implemented in combination in a single embodiment. Conversely, various features described in the context of a single embodiment may also be implemented in multiple embodiments individually or in any suitable sub-combination.

Although the subject matter has been described in a language specific to structural features and/or methodological logic acts, it is to be understood that the subject matter defined in the appended claims is not necessarily limited to the particular features or acts described in the preceding. Conversely, the particular features and acts described in the preceding are merely example forms for performing the claims.

What is claimed is:

1. A video generation method, comprising:
  receiving a triggering operation acting on a video capturing interface and capturing an original video in response to the triggering operation;
  determining a target segment in the original video; and
  performing video synthesis processing based on the target segment and the original video to obtain a target video;
  wherein performing the video synthesis processing based on the target segment and the original video to obtain the target video comprises:
  generating at least one of intro video data or outro video data based on the target segment;
  generating middle video data based on the original video; and
  generating the target video based on the middle video data and the at least one of the intro video data or the outro video data;
  wherein generating the middle video data based on the original video comprises generating the middle video data based on the original video, a set task, and a first preset template.

2. The method according to claim 1, wherein the original video comprises a video obtained by capturing images in which a user performs the set task; and
  the method further comprises:

in response to capturing the original video, displaying prompt information on the video capturing interface to guide the user to perform the set task.

3. The method according to claim 2, wherein the original video comprises a portrait video, and the target video comprises a landscape video.

4. The method according to claim 2, wherein the original video comprises a portrait video, and the target video comprises a landscape video.

5. The method according to claim 1, wherein at least one of the following applies:

generating the intro video data based on the target segment comprising:

generating the intro video data based on the target segment and a second preset template; or generating the outro video data based on the target segment comprising:

generating the outro video data based on the target segment and a third preset template.

6. The method according to claim 5, wherein generating the intro video data based on the target segment and the second preset template comprises:

adding the target segment to a first set position of the second preset template to play the target segment at the first set position;

displaying at least one of identification information of the task or identification information of the user at a second set position of the second preset template; and thus generating the intro video data.

7. The method according to claim 5, wherein generating the outro video data based on the target segment and the third preset template comprises:

taking a target image based on the target segment;

adding the target image to a sixth set position of the third preset template to display the target image at the sixth set position;

according to a task completion degree of the user, displaying matching content corresponding to the completion degree at a seventh set position of the third preset template; and thus generating the outro video data.

8. The method according to claim 5, wherein the original video comprises a portrait video, and the target video comprises a landscape video.

9. The method according to claim 1, wherein generating the middle video data based on the original video, the set task, and the first preset template comprises:

adding the original video to a third set position of the first preset template to play the original video at the third set position;

performing at least one of displaying a matching animation at a fourth set position of the first preset template according to a performance of the user in the set task or displaying associated information of the set task at a fifth set position of the first preset template according to content of the set task; and thus generating the middle video data.

10. The method according to claim 9, wherein displaying the matching animation at the fourth set position of the first preset template according to the performance of the user in the set task comprises at least one of:

in a case where the user speaks a preset word, displaying an animation matching the preset word at the fourth set position;

in a case where the user makes a set action, displaying an animation matching the set action at the fourth set position; or according to an accuracy of the performance of the user in the set task, displaying an animation matching the accuracy at the fourth set position.

11. The method according to claim 1, wherein the original video comprises a portrait video, and the target video comprises a landscape video.

* * * * *